(12) United States Patent
Hokkirigawa et al.

(10) Patent No.: US 6,712,517 B2
(45) Date of Patent: *Mar. 30, 2004

(54) SLEEVE BEARING ARRANGEMENT

(75) Inventors: Kazuo Hokkirigawa, Yonezawa (JP); Rikuro Obara, Nagano-ken (JP); Motoharu Akiyama, Nagano-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/990,429

(22) Filed: Nov. 21, 2001

(65) Prior Publication Data

US 2002/0114548 A1 Aug. 22, 2002

(30) Foreign Application Priority Data

Dec. 15, 2000 (JP) ........................................ 2000-382259

(51) Int. Cl.$^7$ .................................................. C08J 9/00
(52) U.S. Cl. ........................................ 384/279; 521/84.1
(58) Field of Search ........................... 521/84.1; 384/279

(56) References Cited

U.S. PATENT DOCUMENTS

| | | | |
|---|---|---|---|
| 5,185,112 A | | 2/1993 | Saito et al. |
| 5,271,677 A | * | 12/1993 | Sherman et al. ............. 384/114 |
| 5,306,339 A | * | 4/1994 | Takeda et al. ............. 106/38.27 |
| 5,667,310 A | * | 9/1997 | Oyagi et al. ................. 384/137 |
| 6,000,850 A | * | 12/1999 | Takahashi et al. ........... 384/114 |
| 6,502,989 B1 | * | 1/2003 | Takeuchi et al. ............. 384/100 |

FOREIGN PATENT DOCUMENTS

| | | |
|---|---|---|
| DE | 4214878 | 11/1993 |
| DE | 9300397.8 | 7/1994 |
| EP | 0823551 A2 | 2/1998 |
| EP | 0949342 A1 | 10/1999 |

OTHER PUBLICATIONS

English translation of "Development of Hard and Porous Carbon Material 'RB Ceramics' Using Rice Bran as a Starting Material", *Zairyou Kagaku*, vol. 17, No. 6, pp. 24–27, May 1997.

U.S. application Ser. No. 09/990 430, filed Nov. 21, 2001, entitled Material for Bearing Rolling Element; Applicant: Kazuo Hokkirigawa et al.

* cited by examiner

*Primary Examiner*—Jack Lavinder
*Assistant Examiner*—Benjamin A Pezzlo
(74) *Attorney, Agent, or Firm*—Flynn, Thiel, Boutell & Tanis, P.C.

(57) ABSTRACT

There is provided a maintenance-free sleeve bearing arrangement that is light in weight, has a long service life and does not require resupply of oil during operation. The sleeve bearing arrangement is comprised mainly of a shaft and a sleeve bearing, wherein the sleeve bearing formed of CRB ceramics, and/or the shaft formed of the CRB ceramics are used.

6 Claims, 1 Drawing Sheet

SLEEVE BEARING ARRANGEMENT

BACKGROUND OF THE INVENTION

1. Field of the Invention

The invention relates to a sleeve bearing arrangement using a new material, and more particularly, the invention provides a maintenance-free sleeve bearing that does not require resupply of oil during operation. At the same time, it is an object of the invention to provide a sleeve bearing using a high-tech eco-material (state-of-the-art material excellent in ecological adaptability) obtained from biomass type resources, different from conventional industrial material.

2. Description of the Related Art

In the past, sleeve bearings made of a resin such as a polyacetal, a polyamide, etc. have been in use for rotating parts which are light in weight and slow in rotational speed because such sleeve bearings are available at a low cost in comparison with sleeve bearings made of metal.

However, as a lubricating oil is required between a shaft and a sleeve bearing, a method of lengthening the service life of the sleeve bearing has been under study. There are available various methods such as a method of increasing an amount of oil by increasing a volume of a shaft impregnated with oil, a method of replenishing oil by providing an oil pan, a method of preventing spilling of oil by devising an oil seal, and so forth. However, any of these methods has both merits and demerits, and there is room left for improvement.

SUMMARY OF THE INVENTION

The inventor of the present invention has conducted intense studies, and found out that a porous material is obtained by a process comprising the steps of mixing degreased bran derived from rice bran with a thermosetting resin before kneading, subjecting a kneaded mixture to a primary firing in an inert gas at a temperature in a range of 700 to 1000° C., pulverizing the kneaded mixture obtained after the primary firing into carbonized powders sieved through 100 mesh, mixing the carbonized powders with a thermosetting resin before kneading, pressure-forming a kneaded mixture thus obtained at a pressure in a range of 20 to 30 MPa, and applying a heat treatment again to a formed kneaded mixture in the inert gas at a temperature in a range of 100 to 1100° C., and the porous material thus obtained (referred to hereinafter as CRB ceramics) has ideal characteristics as material suitable for use in sleeve bearings.

Further, it has been found that the CRB ceramics described above are insusceptible to damage, light in weight, and have a long service life, and have in addition the ability to retain oil and grease for a long period of time. It has also been found that the porous material not only has ideal characteristics as a material suitable for use in the sleeve bearings but also has a small contraction ratio of the dimensions of a workpiece formed thereof to those of a finished product.

More specifically, the porous material described above has the contraction ratio of the dimensions of a workpiece formed thereof to those of the finished product, as small as 3% or less, 13 wt % of oil retention characteristic, $4.85 \times 10^{-3}$ $\Omega$cm of volume resistivity, and a density in a range of 1.05 to 1.3 g/cm$^3$, and further, it has been possible to obtain the porous material having suitable hardness, and still have a friction coefficient in the order of about 0.15 after being fired at a high temperature.

The inventor of the present invention has found out that it is possible to fabricate a sleeve bearing arrangement, having diverse characteristics, by forming a sleeve bearing from the porous material (the CRB ceramics) obtained by the process comprising the steps of mixing degreased bran derived from rice bran with a thermosetting resin before kneading, subjecting a kneaded mixture to a primary firing in an inert gas at a temperature in a range of 700 to 1000° C., pulverizing the kneaded mixture obtained after the primary firing into carbonized powders sieved through a screen of 100-mesh, mixing the carbonized powders with a thermosetting resin before kneading, pressure-forming a kneaded mixture thus obtained at a pressure in a range of 20 to 30 MPa, and applying a heat treatment again to a formed kneaded mixture in the inert gas at a temperature in a range of 100 to 1100° C., or by combining a conventional sleeve bearing formed of a synthetic resin or a steel-based metal with a shaft formed of the CRB ceramics. First, a typical sleeve bearing arrangement is shown in FIG. 1 wherein reference numeral 1 denotes a shaft, and reference numeral 2 denotes a sleeve bearing.

With the present invention, the shaft 1, and/or the sleeve bearing 2 are formed of the CRB ceramics.

DESCRIPTION OF THE PREFERRED EMBODIMENTS

Figure 1:
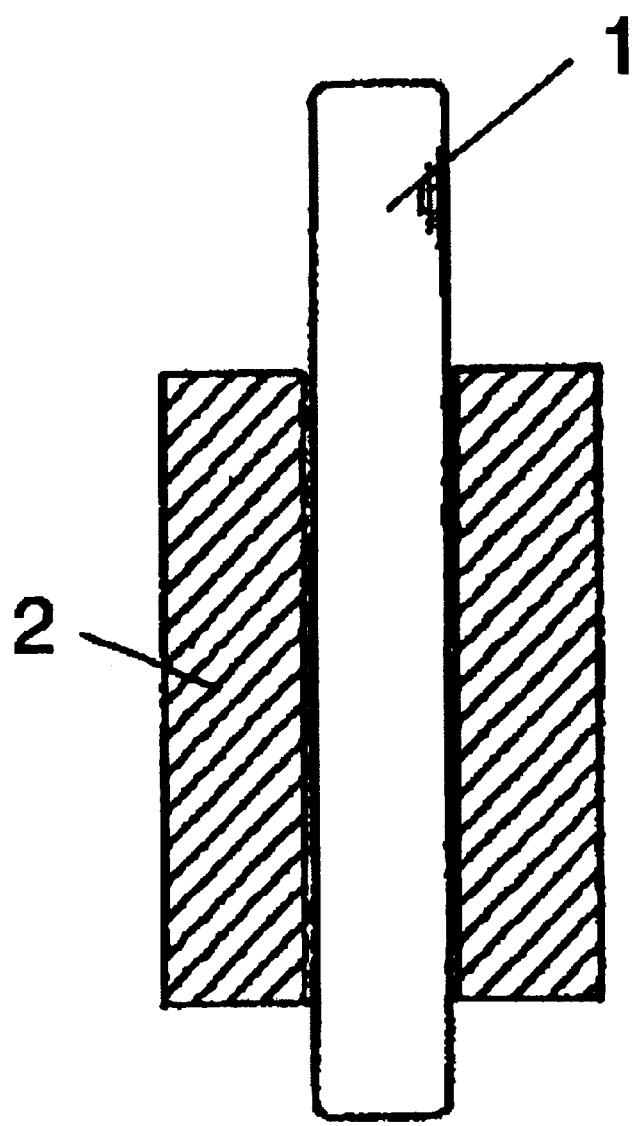
FIG. 1 is a sectional view of a typical embodiment of a sleeve bearing arrangement according to the invention, showing a shaft 1 and a sleeve bearing 2.

Degreased bran derived from rice bran, used in carrying out the present invention, may be either of domestic origin or of foreign origin, regardless of the kind of rice.

Further, any thermosetting resin may be used as long as it has a thermosetting property, and typically cited as a thermosetting resin are a phenol resin, diaryl phthalate resin, unsaturated polyester resin, epoxy resin, polyimide resin, and triazine resin. In particular, the phenol resin is preferably used.

Furthermore, a thermoplastic resin such as a polyamide, and so forth can be used in combination with a thermosetting resin provided that it is done without departing from the spirit and scope of the invention.

A mixing ratio of the degreased bran to a thermosetting resin is 50~90:50~10 by weight, however, a mixing ratio of 75:25 is preferably used.

For the thermosetting resin used in this case, one in a liquid state, having a relatively small molecular weight, is desirable.

A primary firing is applied at a temperature in a range of 700 to 100° C. using normally a rotary kiln for a firing time in a range of 40 to 120 minutes.

A mixing ratio of carbonized powders after the primary firing to a thermosetting resin is 50~90:50~10 by weight, however, a mixing ratio of 75:25 is preferably adopted.

A kneaded mixture of the carbonized powders after the primary firing and the thermosetting resin is pressure-formed at a pressure in a range of 20 to 30 MPa, preferably in a range of 21 to 25 MPa. A mold is preferably at a temperature of about 150° C.

A heat treatment is applied at a temperature in a range of 600 to 1100° C. normally in a well-controlled electric furnace. Firing time is in a range of about 60 to 360 minutes.

A warming rate up to a temperature for the primary firing is required to be relatively moderate up to 500° C. In terms of more specific values, the warming rate is in a range of 0.5 to 2° C./min, preferably 1° C./min.

Further, in lowering the temperature of the kneaded mixture after baking, a relatively moderate cooling rate is required up to 500° C. Upon the temperature dropping to 500° C. or lower, the kneaded mixture is left to cool by itself. In terms of more specific values, a cooling rate is in a range of 0.5 to 4° C./min, preferably at 1° C./min.

Further, for an inert gas, any of helium, argon, neon, and nitrogen gas may be used, however, nitrogen gas is preferably used.

Further, with the present invention, a steel-based metal for use in a shaft or a sleeve bearing may be any of alloys composed of steel and nickel, chromium, molybdenum, or so forth, respectively, provided that it is a hard alloy and resistant to rust.

Furthermore, for a synthetic resin for use in a shaft or a sleeve bearing, it is possible to use any synthetic resin that is reasonably hard and strong, that is, a polyolefin such as hard polyethylene, polypropylene, and so forth, a polyamide such as Nylon 66, a polycarbonate, and so forth.

Embodiments of the invention are summed up as follows:

(1) A bearing arrangement comprised mainly of a shaft and a sleeve bearing, wherein the sleeve bearing is formed of CRB ceramics;

(2) A bearing arrangement as set forth in item (1) above, wherein the shaft is formed of a steel-based metal;

(3) A bearing arrangement as set forth in item (1) above, wherein the shaft is formed of a synthetic resin;

(4) A bearing arrangement as set forth in item (1) above, wherein the shaft is formed of the CRB ceramics;

(5) A bearing arrangement comprised mainly of a shaft and a sleeve bearing, wherein the sleeve bearing is formed of a steel-based metal, and the shaft is formed of CRB ceramics; and (6) A bearing arrangement comprised mainly of a shaft and a sleeve bearing, wherein the sleeve bearing is formed of a synthetic resin, and the shaft is formed of CRB ceramics.

Subsequently, the invention is further described in detail hereinafter based on preferred embodiments thereof, however, it is to be understood that the scope of the invention is not limited to the preferred embodiments in any way.

Production of Material for the Shaft and the Sleeve Bearing

The CRB ceramics were produced under the conditions of Table 1 shown below, and shafts of 2.98 mm (diameter,×20 mm (length) and sleeve bearings 5 mm long with an inside diameter of 3.00 mm and outside diameter of 5.00 mm for housing the shaft therein were formed of the CRB ceramics.

TABLE 1

|  | ex. 1 | ex. 2 | ex. 3 | ex. 4 | ex. 5 | ex. 6 | ex. 7 | conv. ex. |
|---|---|---|---|---|---|---|---|---|
| mix. amt. (g) |  |  |  |  |  |  |  |  |
| degr'd bran | 75 | 75 | 75 | 80 | 60 | 55 | 85 | 75 |
| t-sett. resin | 25 | 25 | 25 | 20 | 40 | 35 | 15 | 25 |

TABLE 1-continued

|  | ex. 1 | ex. 2 | ex. 3 | ex. 4 | ex. 5 | ex. 6 | ex. 7 | conv. ex. |
|---|---|---|---|---|---|---|---|---|
| prim. firing (° C.) | 900 | 900 | 900 | 850 | 1000 | 1000 | 800 | — |
| time (min) | 60 | 60 | 60 | 60 | 70 | 70 | 60 |  |
| aver. particle size (μm) | 90 | 90 | 90 | 40 | 120 | 50 | 130 | — |
| mix. amt. (g) |  |  |  |  |  |  |  |  |
| c. powder | 75 | 75 | 75 | 75 | 75 | 80 | 85 | — |
| t-sett. resin | 25 | 25 | 25 | 25 | 25 | 20 | 15 |  |
| form. press. MPa | 21.5 | 22.5 | 24.5 | 23.5 | 29.5 | 20.5 | 23.5 | 23.5 |
| heat treat. (° C.) | 900 | 200 | 300 | 800 | 1000 | 1100 | 900 | 900 |
| firing time (hr.) | 120 | 100 | 130 | 120 | 100 | 90 | 120 | 120 |
| warm. rate | 1 | 1.5 | 1 | 1.5 | 2 | 1 | 1 | 1 |
| cool. rate | 2 | left to cool | left to cool | 2 | 3 | 2 | 2 | 2 |
| atm. | nitrogen | nitrogen | nitrogen | nitrogen | nitrogen | nitrogen | nitrogen | nitrogen |

Remarks:

the unit of a warming rate and a cooling rate, respectively, is ° C./min.

Abbreviation:

ex. 1=example 1; conv. ex.=conventional example; mix. amt.=mixed amount; degr'd bran=degreased bran; t-sett. resin=thermosetting resin; c. pow-der= carbonized powders; sil. c'rbide=silicon carbide, form. press=forming pressure; heat treat.=heat treatment temperature; warm. rate=warming rate; and cool. rate= cooling rate. "left to cool" means "left to cool by itself".

Embodiments

Fabrication of Sleeve Bearing Arrangements

Shafts and sleeve bearings, formed of steel, shafts and sleeve bearings, formed of Nylon 66, and a diester type lubricating oil are prepared. These shafts and sleeve bearings were used in various combinations with the shafts and sleeve bearings formed of the CRB ceramics, respectively, fabricating sleeve bearing arrangements shown in Table 2.

TABLE 2

|  | sleeve bearing | shaft |
|---|---|---|
| embodiment 1 | fabrication example 1 | steel |
| embodiment 2 | fabrication example 2 | steel |
| embodiment 3 | fabrication example 3 | Nylon 66 |
| embodiment 4 | fabrication example 4 | polycarbonate |
| embodiment 5 | fabrication example 3 | fabrication example 1 |
| embodiment 6 | fabrication example 5 | polyester |
| embodiment 7 | Nylon 66 | fabrication example 2 |
| embodiment 8 | polypropylene | fabrication example 7 |
| embodiment 9 | steel | fabrication example 6 |
| embodiment 10 | fabrication example 1 | fabrication example 7 |
| comparative example 1 | Nylon 66 | steel |

Tests were conducted on the sleeve bearing arrangement fabricated according to the respective embodiments, and test results are shown in Table 3.

TABLE 3

| | lubricant retention after 100 hrs. | lubricant retention after 1000 hrs | overall ranking |
|---|---|---|---|
| embodiment 1 | ⊙ | ○ | ○ |
| embodiment 2 | ⊙ | ○ | ○ |
| embodiment 3 | ⊙ | ○ | ○ |
| embodiment 4 | ⊙ | ○ | ○ |
| embodiment 5 | ⊙ | ⊙ | ⊙ |
| embodiment 6 | ⊙ | ○ | ○ |
| embodiment 7 | ⊙ | ○ | ○ |
| embodiment 8 | ⊙ | ○ | ○ |
| embodiment 9 | ⊙ | ○ | ○ |
| embodiment 10 | ⊙ | | |
| comparative example 1 | △ | X | X |

Remarks:
⊙ = Excellent, ○ = Best, △ = Good, X = Bad

Lubricant retention characteristics after continuous rotation at 50° C. for 100 hrs, and 1000 hrs, respectively, are shown in Table 3.

COMPARITIVE EXAMPLE

For the sake of comparison, a sleeve bearing arrangement comprised of a shaft formed of steel and a sleeve bearing formed of Nylon 66 was fabricated and subjected to a test.

As the bearing according to the invention is light in weight, and still is able to retain oil and grease for a long duration, it has been confirmed that the invention can provide a maintenance-free sleeve bearing arrangement that does not require resupply of oil during operation.

What is claimed is:

1. A bearing arrangement comprised mainly of a shaft and a sleeve bearing, wherein the sleeve bearing is formed of a porous material obtained by a process comprising the steps of mixing degreased bran derived from rice bran with a thermosetting resin to form a mixture, kneading the mixture, subjecting the kneaded mixture to a primary firing in an inert gas at a temperature in the range of 700 to 1000° C., pulverizing the kneaded mixture obtained after the primary firing into carbonized powders, sieving the carbonized powders through a 100-mesh screen, mixing the sieved carbonized powders with a thermosetting resin to form a second mixture, kneading the second mixture, pressure-forming the second kneaded mixture at a pressure in the range of 20 to 30 MPa and subjecting the formed second kneaded mixture to heat treatment in an inert gas at a temperature in a range of 100 to 1100° C.

2. A bearing arrangement of claim 1, wherein the shaft is formed of a steel-based metal.

3. A bearing arrangement of claim 1, wherein the shaft is formed of a synthetic resin.

4. A bearing arrangement of claim 1, wherein the shaft is formed of the porous material.

5. A bearing arrangement comprised mainly of a shaft and a sleeve bearing, wherein the sleeve bearing is formed of a steel-based metal, and the shaft is formed of a porous material obtained by a process comprising the steps of mixing degreased bran derived from rice bran with a thermosetting resin to form a mixture, kneading the mixture, subjecting the kneaded mixture to a primary firing in an inert gas at a temperature in the range of 700 to 1000° C., pulverizing the kneaded mixture obtained after the primary firing into carbonized powders, sieving the carbonized powders through a 100-mesh screen, mixing the sieved carbonized powders with a thermosetting resin to form a second mixture, kneading the second mixture, pressure-forming the second kneaded mixture at a pressure in the range of 20 to 30 MPa and subjecting the formed second kneaded mixture to heat treatment in an inert gas at a temperature in a range of 100 to 1100° C.

6. A bearing arrangement comprised mainly of a shaft and a sleeve bearing, wherein the sleeve bearing is formed of a synthetic resin, and the shaft is formed of a porous material obtained by a process comprising the steps of mixing degreased bran derived from rice bran with a thermosetting resin to form a mixture, kneading the mixture, subjecting the kneaded mixture to a primary firing in an inert gas at a temperature in the range of 700 to 1000° C., pulverizing the kneaded mixture obtained after the primary firing into carbonized powders, sieving the carbonized powders through a 100-mesh screen, mixing the sieved carbonized powders with a thermosetting resin to form a second mixture, kneading the second mixture, pressure-forming the second kneaded mixture at a pressure in the range of 20 to 30 MPa and subjecting the formed second kneaded mixture to heat treatment in an inert gas at a temperature in a range of 100 to 1100° C.

* * * * *